(12) United States Patent
Lee et al.

(10) Patent No.: US 12,315,884 B2
(45) Date of Patent: May 27, 2025

(54) NON-AQUEOUS ELECTROLYTE COMPOSITION FOR LITHIUM SECONDARY BATTERY HAVING IMPROVED LIFESPAN, AND LITHIUM SECONDARY BATTERY INCLUDING SAME

(71) Applicant: SAMYANG CORPORATION, Seoul (KR)

(72) Inventors: Jae Hoon Lee, Daejeon (KR); Young Hwan Kim, Gyeonggi-do (KR); Hoon Ryu, Daejeon (KR); Jae Guk Noh, Daejeon (KR)

(73) Assignee: SAMYANG CORPORATION, Seoul (KR)

( * ) Notice: Subject to any disclaimer, the term of this patent is extended or adjusted under 35 U.S.C. 154(b) by 1285 days.

(21) Appl. No.: 16/977,184

(22) PCT Filed: Feb. 28, 2019

(86) PCT No.: PCT/KR2019/002421
§ 371 (c)(1),
(2) Date: Sep. 1, 2020

(87) PCT Pub. No.: WO2019/168371
PCT Pub. Date: Sep. 6, 2019

(65) Prior Publication Data
US 2021/0043976 A1   Feb. 11, 2021

(30) Foreign Application Priority Data

Mar. 2, 2018 (KR) .................. 10-2018-0025077

(51) Int. Cl.
*H01M 10/0568* (2010.01)
*H01M 10/0525* (2010.01)
*H01M 10/0569* (2010.01)

(52) U.S. Cl.
CPC ... *H01M 10/0568* (2013.01); *H01M 10/0525* (2013.01); *H01M 10/0569* (2013.01); *H01M 2300/0028* (2013.01)

(58) Field of Classification Search
None
See application file for complete search history.

(56) References Cited

U.S. PATENT DOCUMENTS

| 2004/0241553 A1* | 12/2004 | Abe | H01M 6/181 |
|---|---|---|---|
| | | | 429/337 |
| 2010/0183913 A1* | 7/2010 | Sliger | H01M 6/168 |
| | | | 429/178 |

FOREIGN PATENT DOCUMENTS

| JP | 2014-127346 A | 7/2014 |
|---|---|---|
| KR | 10-2004-0070307 A | 8/2004 |
| KR | 10-1079518 B1 | 11/2011 |
| KR | 10-2012-0066904 A | 6/2012 |
| KR | 10-2014-0147038 A | 12/2014 |
| KR | 10-2016-0042525 A | 4/2016 |
| KR | 10-2016-0050221 A | 5/2016 |
| KR | 10-2016-0050222 A | 5/2016 |
| KR | 10-2017-0022913 A | 3/2017 |

OTHER PUBLICATIONS

Wu Xu, Zheng-Hua Deng, Xiao-Zheng Zhang and Guo-Xiang Wan, The influence of the compatibility of plasticizers with polymer ionic conductors on ionic conduction, Jan. 1998, Springer-Verlag, J Solid State Electrochemistry (1998) 2: 257-261) (Year: 1998).*
International Search Report from corresponding PCT Application No. PCT/KR2019/002421, dated Jun. 7, 2019.

* cited by examiner

*Primary Examiner* — Maria Laios
(74) *Attorney, Agent, or Firm* — Harness, Dickey & Pierce, P.L.C.

(57) ABSTRACT

The present invention relates to: a non-aqueous electrolyte composition for a lithium secondary battery, comprising an anhydrosugar alcohol derivative; and a lithium secondary battery including same and, more specifically, to: a non-aqueous electrolyte composition comprising a specific amount of an anhydrosugar alcohol derivative as an additive and being capable of providing a lithium secondary battery having an improved battery lifespan property and storage stability; and a lithium secondary battery including same.

7 Claims, 1 Drawing Sheet

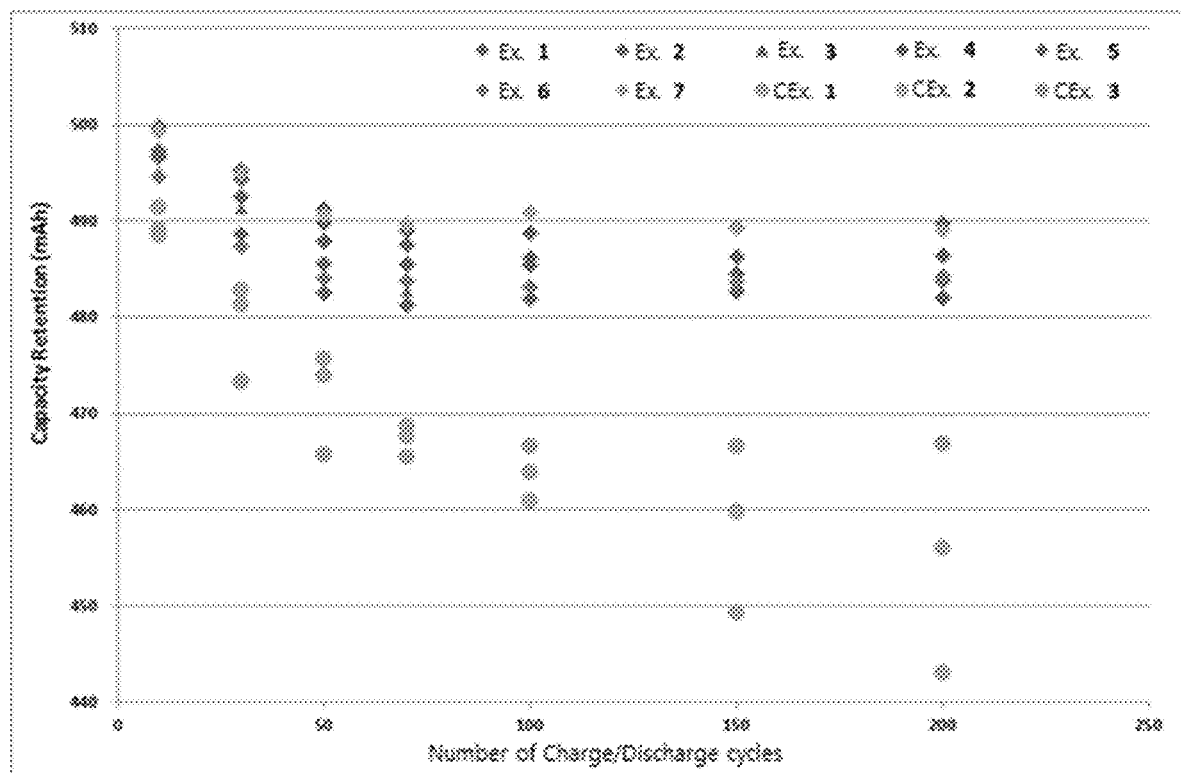
Ex.: Example
CEx.: Comparative Example

NON-AQUEOUS ELECTROLYTE COMPOSITION FOR LITHIUM SECONDARY BATTERY HAVING IMPROVED LIFESPAN, AND LITHIUM SECONDARY BATTERY INCLUDING SAME

CROSS-REFERENCE TO RELATED APPLICATIONS

This application is a national phase application of PCT Application No. PCT/KR2019/002421, filed on Feb. 28, 2019, which claims priority to Korean Patent Application No. 10-2018-0025077, filed on Mar. 2, 2018. The entire disclosure of the applications identified in this paragraph is incorporated herein by references.

FIELD

The present invention relates to a non-aqueous electrolyte composition for lithium secondary battery comprising anhydrosugar alcohol derivative and a lithium secondary battery comprising the same, and more specifically, a non-aqueous electrolyte composition which comprises anhydrosugar alcohol derivative as an additive in a specific amount and can provide a lithium secondary battery with improved life cycle property and storage stability, and a lithium secondary battery comprising the same.

BACKGROUND

Hydrogenated sugar (also referred to as "sugar alcohol") means a compound obtained by adding hydrogen to the reductive end group in sugar, and generally has a chemical formula of $HOCH_2(CHOH)_nCH_2OH$ wherein n is an integer of 2 to 5. According to the number of carbon atoms, hydrogenated sugar is classified into tetritol, pentitol, hexitol and heptitol (4, 5, 6 and 7 carbon atoms, respectively). Among them, hexitol having 6 carbon atoms includes sorbitol, mannitol, iditol, galactitol, etc. and in particular, sorbitol and mannitol are very useful materials.

Anhydrosugar alcohol has a diol form with two hydroxyl groups in the molecule, and can be produced by using hexitol derived from starch (for example, Korean Patent No. 10-1079518 and Korean Laid-open Patent Publication No. 10-2012-0066904). Because anhydrosugar alcohol is an environmentally friendly material derived from recyclable natural resources, it has received much interest for a long time and researches on its production continue to proceed. Among such anhydrosugar alcohols, isosorbide produced from sorbitol has the widest industrial applicability at present.

Anhydrosugar alcohol can be used in various fields including treatment of heart and blood vessel diseases, patch adhesive, medicaments such as mouthwash, etc., solvents for compositions in the cosmetics industry, emulsifiers in the food industry, etc. In addition, it can increase the glass transition temperature of polymer materials like polyester, PET, polycarbonate, polyurethane, epoxy resin, etc., and improve the strength of such materials. Furthermore, because anhydrosugar alcohol is an environmentally friendly material derived from natural resources, it is very useful in the plastics industry such as bioplastics and the like. It is also known that anhydrosugar alcohol can be used as an adhesive, environmentally friendly plasticizer, biodegradable polymer, and environmentally friendly solvent for water-soluble lacquer.

As such, anhydrosugar alcohol is receiving much interest because of its wide applicability, and the level of practical industrial application thereof is increasing.

A lithium secondary battery is composed of a case, a cathode and an anode therein, a membrane for separating the cathode and anode (separator), and an electrolyte containing lithium ions.

Since a lithium secondary battery is operated at high driving voltage, a non-aqueous organic solvent containing dissolved lithium salt is used therefor, instead of an aqueous electrolyte having high reactivity with lithium. As such an organic solvent, carbonate solvent is mainly used since it is effective in improving the ion conductivity. Carbonate solvent is divided into cyclic type and acyclic type. Cyclic carbonate includes ethylene carbonate, propylene carbonate, ethylpropylene carbonate, etc., and acyclic carbonate includes dimethyl carbonate, ethyl methyl carbonate, methyl propyl carbonate, methyl butyl carbonate, ethyl propyl carbonate, diethyl carbonate, etc.

At the initial charge of lithium secondary battery, an irreversible reaction is conducted wherein the charge is used excessively by the side reaction between the anode/cathode and the electrolyte liquid. Due to the side reaction, a passivation layer such as Solid-Electrolyte Interphase (SEI) layer is formed on the surface of the anode while a protection layer is formed on the surface of the cathode. At the charge/discharge of the battery, the SEI layer inhibits decomposition of the electrolyte liquid and plays a role of ion tunnel.

Various additives in electrolyte liquid for forming the SEI layer are disclosed (for instance, Korean Laid-open Patent Publication Nos. 10-2014-0147038 A and 10-2017-0022913 A). However, a lithium secondary battery comprising an electrolyte liquid containing phosphonate and/or sulfonate additive as disclosed in the above publications has a problem of insufficient rate of maintaining life cycle at repeated charge/discharge of the battery.

Problems to be Solved

The purpose of the present invention is to provide a non-aqueous electrolyte composition which can provide a lithium secondary battery with improved life cycle property and storage stability, and a lithium secondary battery comprising the same.

Technical Means

In order to achieve the above-stated purpose, the present invention provides a non-aqueous electrolyte composition for lithium secondary battery, comprising: electrolyte solvent; lithium salt; and anhydrosugar alcohol derivative component selected from diester of anhydrosugar alcohol, diether of anhydrosugar alcohol or a combination thereof, wherein the composition comprises the anhydrosugar alcohol derivative component in an amount of greater than 0.05 part by weight and less than 7.0 parts by weight, based on total 100 parts by weight of the electrolyte solvent.

According to a preferable embodiment of the present invention, the anhydrosugar alcohol derivative component may be one or more selected from the group consisting of compounds represented by the following formulas 1 to 3:

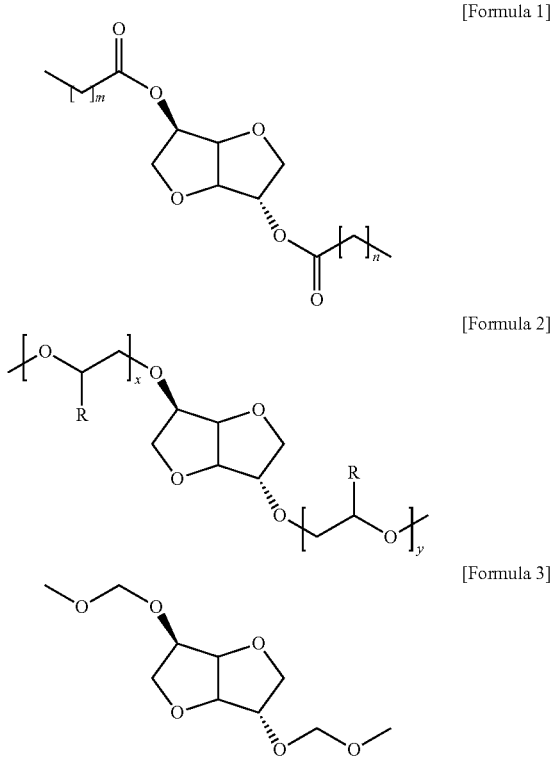

[Formula 1]

[Formula 2]

[Formula 3]

wherein:

in the above formula 1, m is an integer of 1 to 15, and n is an integer of 1 to 15; and in the above formula 2, R is independently hydrogen atom or methyl group, x is an integer of 0 to 10, and y is an integer of 0 to 10.

In another aspect, the present invention provides a lithium secondary battery comprising the electrolyte composition of the present invention.

Effect of the Invention

The electrolyte composition according to the present invention comprises anhydrosugar alcohol derivative selected from diester of anhydrosugar alcohol, diether of anhydrosugar alcohol or a combination thereof in a specific amount, and thereby, when used in a lithium secondary battery, even without using a separate additive for forming SEI layer, it forms a stable SEI layer and a protection layer on the surfaces of the electrodes to inhibit chemical reaction between the electrodes and the electrolyte liquid, and thus can improve the life cycle property and storage stability of the battery.

BRIEF DESCRIPTION OF THE DRAWINGS

FIG. 1 is a graph showing the results of discharge capacity retention tests at 45° C. conducted in the Examples of the present invention.

DETAILED DESCRIPTION

The present invention is explained in more detail below.
The electrolyte composition of the present invention comprises electrolyte solvent.

For the electrolyte solvent, any solvent conventionally used as electrolyte for lithium secondary battery can be used, and more concretely, carbonate solvent can be used.

As the carbonate solvent, a cyclic carbonate such as ethylene carbonate, propylene carbonate, etc.; an acyclic carbonate such as dimethyl carbonate, ethyl methyl carbonate, methyl propyl carbonate, methyl butyl carbonate, ethyl propyl carbonate, diethyl carbonate, etc.; or a combination thereof can be used.

According to an embodiment of the present invention, the electrolyte solvent component can be selected from the group consisting of ethylene carbonate, ethyl methyl carbonate or a combination thereof, and more preferably, a combination of ethylene carbonate and ethyl methyl carbonate can be used.

In an embodiment, when the electrolyte composition of the present invention comprises a combination of ethylene carbonate and ethyl methyl carbonate as the electrolyte solvent component, the amount of the ethylene carbonate solvent can be 10 to 50% by volume, more concretely 20 to 40% by volume, based on the total volume of the electrolyte solvent, and the amount of the ethyl methyl carbonate solvent can be 50 to 90% by volume, more concretely 60 to 80% by volume, based on the total volume of the electrolyte solvent.

The electrolyte composition of the present invention comprises lithium salt.

For the lithium salt, any lithium salt conventionally used for lithium secondary battery can be used without limitation.

In an embodiment, the lithium salt can be one or more compounds selected from the group consisting of LiSCN, LiBr, LiI, $LiPF_6$, $LiBF_4$, $LiSbF_6$, $LiAsF_6$, $LiCH_3SO_3$, $LiCF_3SO_3$, $LiClO_4$, $LiBPh_4$, $LiC(CF_3SO_2)_3$, $LiN(CF_3SO_2)_2$, $LiN(C_2F_5SO_2)_2$, $LiN(SFO_2)_2$, or $LiN(CF_3CF_2SO_2)_2$, but it is not limited thereto. "Ph" herein means phenyl.

The concentration of the lithium salt can be determined in consideration of ion conductivity, etc., and it can be preferably 0.2 to 2.0 M, or 0.5 to 1.6 M, but it is not limited thereto. If the lithium salt concentration in the electrolyte composition is too low, it is hard to secure suitable ion conductivity for driving the battery. In contrast, if the lithium salt concentration is too high, the viscosity of the electrolyte liquid increases so that the mobility of lithium ion may decrease, and the decomposition reaction of lithium salt itself increases so that the performance of the battery may be lowered.

The electrolyte composition of the present invention comprises anhydrosugar alcohol derivative component selected from diester of anhydrosugar alcohol, diether of anhydrosugar alcohol or a combination thereof.

The anhydrosugar alcohol means any material that is obtained by removing one or more water molecules from a compound—generally referred to as hydrogenated sugar or sugar alcohol—which is obtained by adding hydrogen to the reductive end group in sugar.

The anhydrosugar alcohol may be dianhydrohexitol which is the dehydrated product of hexitol, and more preferably, it may be selected from isosorbide (1,4:3,6-dianhydrosorbitol), isomannide (1,4:3,6-dianhydromannitol), isoidide (1,4:3,6-dianhydroiditol) or mixtures thereof, and most preferably, it may be isosorbide.

Concretely, the diester of anhydrosugar alcohol may be diester of anhydrosugar alcohol and $C_1$-$C_{15}$ alkyl carboxylic acid; more concretely, diester of anhydrosugar alcohol and $C_1$-$C_{12}$ alkyl carboxylic acid; still more concretely, diester of anhydrosugar alcohol and $C_1$-$C_9$ alkyl carboxylic acid; and still more concretely, diester of anhydrosugar alcohol and $C_1$-$C_7$ alkyl carboxylic acid.

Concretely, the diether of anhydrosugar alcohol may be di($C_1$-$C_4$)alkyl ether of anhydrosugar alcohol or anhydrosugar alcohol-alkylene glycol; more concretely, di($C_1$-$C_4$) alkyl ether of anhydrosugar alcohol or anhydrosugar alcohol-($C_1$-$C_3$)alkylene glycol; still more concretely, di($C_1$-$C_2$) alkyl ether of anhydrosugar alcohol or anhydrosugar alcohol-($C_1$-$C_3$)alkylene glycol; and still more concretely, di($C_1$)alkyl ether of anhydrosugar alcohol or anhydrosugar alcohol-($C_1$-$C_3$)alkylene glycol.

The electrolyte composition of the present invention comprises the anhydrosugar alcohol derivative component in an amount of greater than 0.05 part by weight and less than 7.0 parts by weight, based on total 100 parts by weight of the electrolyte solvent. If the amount of the anhydrosugar alcohol derivative component is 0.05 part by weight or less based on total 100 parts by weight of the electrolyte solvent, the property of maintaining life cycle and storage stability of the battery may deteriorate. In contrast, if the amount of the anhydrosugar alcohol derivative component is 7.0 part by weight or greater based on total 100 parts by weight of the electrolyte solvent, the property of maintaining life cycle of the battery may deteriorate.

More concretely, the electrolyte composition of the present invention may comprise the anhydrosugar alcohol derivative component in an amount of 0.06 part by weight or more, 0.07 part by weight or more, 0.08 part by weight or more, 0.09 part by weight or more, or 0.1 part by weight or more, and 6.8 parts by weight or less, 6.6 parts by weight or less, 6.4 parts by weight or less, 6.2 parts by weight or less, 6 parts by weight or less, 5.8 parts by weight or less, 5.6 parts by weight or less, 5.4 parts by weight or less, 5.2 parts by weight or less, or 5 parts by weight or less, based on total 100 parts by weight of the electrolyte solvent.

In a preferable embodiment of the present invention, the anhydrosugar alcohol derivative component may be one or more selected from the group consisting of compounds represented by the following formulas 1 to 3:

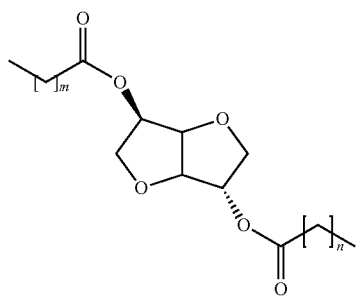

[Formula 1]

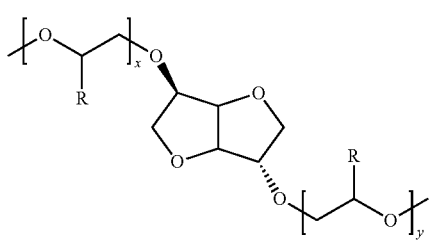

[Formula 2]

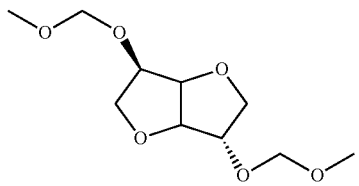

[Formula 3]

wherein:
in the above formula 1, m is an integer of 1 to 15, and n is an integer of 1 to 15; and
in the above formula 2, R is independently hydrogen atom or methyl group, x is an integer of 0 to 10, and y is an integer of 0 to 10.

In the above formula 1, more concretely, m is an integer of 1 to 12, and n is an integer of 1 to 12; still more concretely, m is an integer of 1 to 9, and n is an integer of 1 to 9; and still more concretely, m is an integer of 1 to 7, and n is an integer of 1 to 7.

In the above formula 2, more concretely, x is an integer of 0 to 5, and y is an integer of 0 to 5; and still more concretely, x is an integer of 0 to 3, and y is an integer of 0 to 3.

In an embodiment, when the electrolyte composition of the present invention comprises a compound represented by the above formula 1 as the anhydrosugar alcohol derivative component, the amount thereof may be 0.06 part by weight to 6.5 parts by weight, more concretely 0.06 part by weight to 5.5 parts by weight, and still more concretely 0.1 part by weight to 5 parts by weight, based on total 100 parts by weight of the electrolyte solvent.

In another embodiment, when the electrolyte composition of the present invention comprises a compound represented by the above formula 2 as the anhydrosugar alcohol derivative component, the amount thereof may be 0.06 part by weight to 6.5 parts by weight, more concretely 0.1 part by weight to 5 parts by weight, and still more concretely 0.5 part by weight to 4 parts by weight, based on total 100 parts by weight of the electrolyte solvent.

In another embodiment, when the electrolyte composition of the present invention comprises a compound represented by the above formula 3 as the anhydrosugar alcohol derivative component, the amount thereof may be 0.06 part by weight to 6.5 parts by weight, more concretely 0.1 part by weight to 6 parts by weight, and still more concretely 0.5 part by weight to 5.5 parts by weight, based on total 100 parts by weight of the electrolyte solvent.

The anhydrosugar alcohol derivative component used in the present invention can form a Solid-Electrolyte Interphase (SEI) layer on the surface of the anode material through chemical reaction, and the SEI layer improves the property of maintaining life cycle and storage stability of the lithium secondary battery by inhibiting chemical reaction between the electrodes and the electrolyte liquid.

Concretely, in case of using the anhydrosugar alcohol derivative component in an electrolyte composition within the specific amount range according to the present invention, since the SEI layer is formed on the surface of the anode material with a suitable thickness, swelling of the anode material due to the migration of lithium ion according to the repeated expansion and shrinkage of the anode material during continuous charge/discharge can be inhibited, and thus the thickness increase due to internal pressure elevation can be inhibited, and thereby even the property of maintaining life cycle can be improved. However, in case of not using the anhydrosugar alcohol derivative component or using it with an amount less than the amount specified according to the present invention, an SEI layer is not formed or slightly formed, and thus the thickness increases due to internal pressure elevation and the phenomenon of life cycle deterioration is also generated. In contrast, in case of using the anhydrosugar alcohol derivative component with an amount greater than the amount specified according to the present invention, the SEI layer is rather formed too firmly, and thus even the migration of lithium ion between the electrodes is prevented and thereby the phenomenon of life cycle deterioration may be generated.

In addition to the above-explained components, the electrolyte composition of the present invention may further comprise one or more additives conventionally used in an electrolyte for lithium secondary battery.

In an embodiment, although it is not limited thereto, the electrolyte composition of the present invention may further comprise metal-halide additive.

For the metal-halide additive, metal chloride, metal bromide or metal iodide may be used. In addition, the metal-halide additive may be a metal compound having divalent or greater valency.

In an embodiment, the metal-halide additive may be one or more compounds selected from the group consisting of magnesium chloride ($MgCl_2$), magnesium bromide ($MgBr_2$) or magnesium iodide ($MgI_2$), but it is not limited thereto.

The concentration of the metal-halide additive may be 0.01 to 1.0 M, or 0.05 to 1.0 M, or 0.1 to 1.0 M, or 0.1 to 0.5 M, but it is not limited thereto. If the concentration of the metal-halide additive in the electrolyte composition is too low, the effect of enhancing the battery performance according to its addition is not expressed sufficiently. If the concentration of the metal-halide additive is too high, the viscosity of the electrolyte liquid increases so that the mobility of lithium ion may be lowered, and thus the battery performance may deteriorate to the contrary.

In an embodiment, although it is not limited thereto, the electrolyte composition of the present invention may further comprise inorganic microparticle.

For the inorganic microparticle, electronically not conductive and electrochemically stable one is preferably selected, and ionically conductive one is more preferable. Concretely, ionically conductive or non-conductive ceramic microparticle such as $\alpha$, $\beta$, $\gamma$-alumina, silica, etc. may be used, but it is not limited thereto.

According to another aspect of the present invention, a lithium secondary battery comprising the electrolyte composition of the present invention is provided.

The lithium secondary battery of the present invention is characterized in comprising the electrolyte composition of the present invention, and for other constitutional elements of lithium secondary battery, it may comprise a cathode, an anode and a membrane for separating the cathode and anode (separator) conventionally used for lithium secondary battery without limitation.

The lithium secondary battery of the present invention may have a conventional structure. In an embodiment, the lithium secondary battery may comprise an anode containing lithium metal or lithium alloy (for example, alloy of Li with Si, Sn, In, etc.), a cathode which is a porous current collector carrying a complex metal oxide catalyst, and a separator impregnated with the electrolyte composition between the cathode and anode.

As a material for the anode, those capable of being doped/undoped with lithium ion may be used. Concretely, carbonaceous compound such as graphite, thermally decomposed carbon, cokes, vitreous carbon, calcinated organic polymer, mesocarbon microbeads, carbon fiber, active carbon, etc. may be used, but it is not limited thereto.

The cathode may comprise complex metal oxide (for example, metal oxide such as $LiCoO_2$, $LiMn_2O_4$, $LiNiO_2$, $LiNiCoO_2$, manganese dioxide, vanadium pentoxide, chromic oxide, etc., or metal sulfide such as titanium disulfide, molybdenium disulfide, etc.), and if necessary, a conducting agent (for example, flake-shaped graphite, carbon black, acetylene black, etc.) or a binding agent (for example, poly(vinylidene fluoride), poly(tetrafluoroethylene), etc.) or the like may be used. The material for the porous current collector carrying a complex metal oxide catalyst may be aluminum, nickel, iron, titanium or the like, but it is not limited thereto.

In addition, for the separator placed between the cathode and anode, a porous film of polyethylene, polypropylene or the like, or a non-woven fabric may be used, but it is not limited thereto.

For the case of the lithium secondary battery of the present invention, a case of conventional shape such as coin type, disc type, cylinder type, laminate type or the like may be applied.

The present invention is explained in more detail through the following Examples and Comparative Examples. However, the scope of the present invention is not limited thereby in any manner.

EXAMPLES

<Preparation of Electrolyte Composition and Lithium Secondary Battery>

Example 1

Preparation of Electrolyte Composition

Ethylene carbonate (EC) and ethyl methyl carbonate (EMC) were mixed with a volumetric ratio of 30:70 to prepare an electrolyte solvent. Then, based on total 100 parts by weight of the present electrolyte solvent, 0.1 part by weight of a compound of formula 1 (m=2, n=2) was added thereto. Then, $LiPF_6$ was dissolved in the mixture of the electrolyte solvent and the compound of formula 1 (m=2, n=2) so that the lithium ion concentration became 1.0 M, to prepare an electrolyte composition for lithium secondary battery.

Preparation of Cathode

To 100 parts by weight of N-methyl-2-pyrrolidone (NMP) solvent, 40 parts by weight of a cathode binding agent was added to prepare a cathode binder composition. Then, the cathode binder composition was applied to a cathode current collector (aluminum foil) with a thickness of 100 μm and dried, and then subjected to roll press to prepare a cathode. The cathode binding agent in the above was that prepared by mixing a cathode active material (lithium cobalt complex oxide, $LiCoO_2$), a conducting agent (carbon black) and a binder (poly(vinylidene fluoride), PVDF) with weight ratio of 92:4:4, respectively.

Preparation of Anode

To 100 parts by weight of N-methyl-2-pyrrolidone (NMP) solvent, 90 parts by weight of an anode binding agent was added to prepare an anode binder composition. Then, the anode binder composition was applied to an anode current collector (copper foil) with a thickness of 90 μm and dried, and then subjected to roll press to prepare an anode. The anode binding agent in the above was that prepared by mixing natural graphite, a conducting agent (carbon black), a thickening agent (carboxymethylcellulose) and a binder (PVDF) with weight ratio of 96:1:1:2, respectively.

Preparation of Lithium Secondary Battery

The cathode and anode prepared above was laminated with a porous polyethylene film to prepare an electrode assembly, and the electrolyte composition prepared above was injected therein to prepare a lithium secondary battery.

Example 2

Excepting that the amount of the compound of formula 1 ($m=2$, $n=2$) as additive was changed from 0.1 part by weight to 2.0 parts by weight in the preparation procedure of the electrolyte composition, the same methods as those of Example 1 were conducted to prepare an electrolyte composition and a lithium secondary battery comprising the same.

Example 3

Excepting that the amount of the compound of formula 1 ($m=2$, $n=2$) as additive was changed from 0.1 part by weight to 5.0 parts by weight in the preparation procedure of the electrolyte composition, the same methods as those of Example 1 were conducted to prepare an electrolyte composition and a lithium secondary battery comprising the same.

Example 4

Excepting that, instead of 0.1 part by weight of the compound of formula 1 ($m=2$, $n=2$), 2.0 parts by weight of the compound of formula 3 was used as additive in the preparation procedure of the electrolyte composition, the same methods as those of Example 1 were conducted to prepare an electrolyte composition and a lithium secondary battery comprising the same.

Example 5

Excepting that, instead of 0.1 part by weight of the compound of formula 1 ($m=2$, $n=2$), 5.0 parts by weight of the compound of formula 3 was used as additive in the preparation procedure of the electrolyte composition, the same methods as those of Example 1 were conducted to prepare an electrolyte composition and a lithium secondary battery comprising the same.

Example 6

Excepting that, instead of 0.1 part by weight of the compound of formula 1 ($m=2$, $n=2$), 2.0 parts by weight of a compound of formula 2 ($x=2$, $y=3$, $R=H$) was used as additive in the preparation procedure of the electrolyte composition, the same methods as those of Example 1 were conducted to prepare an electrolyte composition and a lithium secondary battery comprising the same.

Example 7

Excepting that, instead of 0.1 part by weight of the compound of formula 1 ($m=2$, $n=2$), 1.0 part by weight of a compound of formula 2 ($x=4$, $y=5$, $R=CH_3$) was used as additive in the preparation procedure of the electrolyte composition, the same methods as those of Example 1 were conducted to prepare an electrolyte composition and a lithium secondary battery comprising the same.

Comparative Example 1

Excepting that the compound of formula 1 ($m=2$, $n=2$) was not used as additive in the preparation procedure of the electrolyte composition, the same methods as those of Example 1 were conducted to prepare an electrolyte composition and a lithium secondary battery comprising the same.

Comparative Example 2

Excepting that the amount of the compound of formula 1 ($m=2$, $n=2$) as additive was changed from 0.1 part by weight to 0.05 part by weight in the preparation procedure of the electrolyte composition, the same methods as those of Example 1 were conducted to prepare an electrolyte composition and a lithium secondary battery comprising the same.

Comparative Example 3

Excepting that the amount of the compound of formula 1 ($m=2$, $n=2$) as additive was changed from 0.1 part by weight to 7.0 parts by weight in the preparation procedure of the electrolyte composition, the same methods as those of Example 1 were conducted to prepare an electrolyte composition and a lithium secondary battery comprising the same.

The components and their amounts in the electrolyte compositions prepared in the above Examples 1 to 7 and Comparative Examples 1 to 3 are provided in the following Table 1.

TABLE 1

| | | Electrolyte solvent (vol %) | | Anhydrosugar alcohol derivative (part by weight) | | | Lithium salt |
|---|---|---|---|---|---|---|---|
| | | EC | EMC | Formula 1 | Formula 2 | Formula 3 | (molar concentration) |
| Example | 1 | 30 | 70 | $m=2$, $n=2$ (0.1) | — | — | LiPF$_6$ |
| | 2 | | | $m=2$, $n=2$ (2.0) | — | — | (1M) |
| | 3 | | | $m=2$, $n=2$ (5.0) | — | — | |
| | 4 | | | — | — | (2.0) | |
| | 5 | | | — | — | (5.0) | |
| | 6 | | | — | $x=2$, $y=3$, $R=H$ (2.0) | — | |
| | 7 | | | — | $x=2$, $y=3$, $R=CH_3$ (1.0) | — | |

TABLE 1-continued

| | | Electrolyte solvent (vol %) | | Anhydrosugar alcohol derivative (part by weight) | | | Lithium salt |
|---|---|---|---|---|---|---|---|
| | | EC | EMC | Formula 1 | Formula 2 | Formula 3 | (molar concentration) |
| Comparative Example | 1 | 30 | 70 | — | — | — | LiPF$_6$ (1M) |
| | 2 | | | m = 2, n = 2 (0.05) | — | — | |
| | 3 | | | m = 2, n = 2 (7.0) | — | — | |

EC: ethylene carbonate
EMC: ethyl methyl carbonate
Amount of electrolyte solvent: based on total volume of the electrolyte solvent
Amount of anhydrosugar alcohol derivative: based on total 100 parts by weight of the electrolyte solvent <Evaluation of the Properties of Lithium Secondary Battery>

The properties of the lithium secondary batteries prepared in the above Examples 1 to 7 and Comparative Examples 1 to 3 were evaluated according to the following methods, and the results are provided in the following Table 2. In addition, the results of discharge capacity retention tests at 45° C. were shown in FIG. 1.

(1) Discharge capacity retention test at 45° C.: The lithium secondary batteries prepared in the above Examples 1 to 7 and Comparative Examples 1 to 3 were tested with regard to the discharge capacity at 45° C. Concretely, the prepared lithium secondary battery was charged in a static current-static voltage mode at 45° C. with 500 mAh until 4.2 V, and the charging was finished when the charge capacity was lowered to 50 mAh. After 10 minutes from the finish of charging, the battery was discharged in a static current mode with 500 mAh until 3.0 V. The above procedure of one time of charge and one time of discharge was defined as one cycle, and while conducting 200 cycles of charge/discharge, the rates of maintaining charge capacity to the initial charge capacity (rate of maintaining life cycle) at 45° C. were measured.

(2) Storage stability at 55° C.: The lithium secondary batteries prepared in the above Examples 1 to 7 and Comparative Examples 1 to 3 were tested with regard to the storage stability at 55° C. Concretely, the prepared lithium secondary batteries were stored at the temperature condition of 55° C. for two (2) weeks, and then the rates of thickness increase were measured.

TABLE 2

| | | Charge capacity after 200 cycles (mAh) | Rate of maintaining charge capacity to the initial charge capacity after 200 cycles (%) | Rate of thickness increase after two weeks' storage at 55° C. (%) |
|---|---|---|---|---|
| Example | 1 | 482 | 96.4 | 127 |
| | 2 | 489 | 98.4 | 118 |
| | 3 | 484 | 97.8 | 112 |
| | 4 | 486 | 97.9 | 115 |
| | 5 | 483 | 97.3 | 113 |
| | 6 | 484 | 97.9 | 117 |
| | 7 | 488 | 97.9 | 124 |
| Comparative Example | 1 | 442 | 90.1 | 165 |
| | 2 | 456 | 93.2 | 148 |
| | 3 | 466 | 93.7 | 110 |

As described in the above Table 2, in case of Examples 1 to 7 using the anhydrosugar alcohol derivative compound as additive within the amount range specified according to the present invention, the lithium secondary batteries showed good rates (96% or greater) of maintaining charge capacity to the initial charge capacity (rate of maintaining life cycle) after 200 cycles, and good rates (127% or less) of thickness increase after the two weeks' storage at 55° C.

To the contrary, in case of not using the anhydrosugar alcohol derivative compound as additive (Comparative Example 1) or using it with an amount less than the amount specified according to the present invention (Comparative Example 2), the lithium secondary batteries showed remarkably lowered rates of maintaining charge capacity to the initial charge capacity (rate of maintaining life cycle) after 200 cycles, and poor rates (148% or greater) of thickness increase after the two weeks' storage at 55° C. In addition, in case of using the anhydrosugar alcohol derivative compound as additive with an amount greater than the amount specified according to the present invention (Comparative Example 3), the lithium secondary battery showed a lower rate of maintaining charge capacity to the initial charge capacity (rate of maintaining life cycle) after 200 cycles, as compared with the present Examples.

That is, in case of using the anhydrosugar alcohol derivative compound as additive within the amount range specified according to the present invention, an SEI layer was formed by chemical reaction, and thereby it was possible to inhibit the volume expansion of the lithium secondary battery through repeated expansion and shrinkage during continuous charge/discharge, resulting in relatively less thickness increase and improved rate of maintaining life cycle. However, in case of not using the anhydrosugar alcohol derivative compound as additive or using it with an amount less than the amount specified according to the present invention, an SEI layer was not formed or slightly formed, and thus the volume of the lithium secondary battery was expanded due to internal pressure elevation of the battery, resulting in remarkable increase of the thickness and poor rate of maintaining life cycle. In addition, in case of using the anhydrosugar alcohol derivative compound as additive with an amount greater than the amount specified according to the present invention, the SEI layer was rather formed too firmly, resulting in lowered mobility of lithium ion and lowered rate of maintaining life cycle.

What is claimed is:

1. An electrolyte composition for lithium secondary battery, comprising:
    electrolyte solvent;
    lithium salt; and
    anhydrosugar alcohol derivative component selected from diester of anhydrosugar alcohol represented by Formula 1, diether of anhydrosugar alcohol represented by Formula 3 or a combination thereof, wherein the composition comprises the anhydrosugar alcohol derivative component in an amount of greater than 0.05 part by weight and less than 7.0 parts by weight, based on total 100 parts by weight of the electrolyte solvent:

[Formula 1]

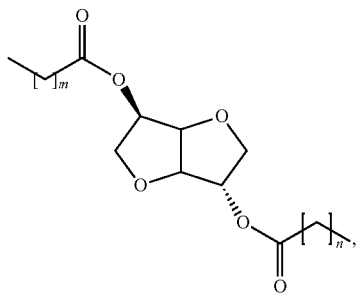

[Formula 3]

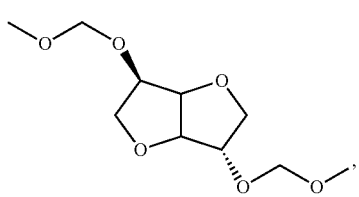

wherein:
in the above formula 1, m is an integer of 1 to 15, and n is an integer of 1 to 15.

2. The electrolyte composition for lithium secondary battery of claim 1, wherein the electrolyte solvent is a carbonate solvent.

3. The electrolyte composition for lithium secondary battery of claim 2, wherein the carbonate solvent is selected from the group consisting of ethylene carbonate, ethyl methyl carbonate or a combination thereof.

4. The electrolyte composition for lithium secondary battery of claim 1, wherein the lithium salt is one or more selected from the group consisting of LiSCN, LiBr, LiI, $LiPF_6$, $LiBF_4$, $LiSbF_6$, $LiAsF_6$, $LiCH_3SO_3$, $LiCF_3SO_3$, $LiClO_4$, $LiBPh_4$, $LiC(CF_3SO_2)_3$, $LiN(CF_3SO_2)_2$, $LiN(C_2F_5SO_2)_2$, or $LiN(SFO_2)_2$, or $LiN(CF_3CF_2SO_2)_2$.

5. The electrolyte composition for lithium secondary battery of claim 1, comprising as the anhydrosugar alcohol derivative component, the diester of anhydrosugar alcohol represented by formula 1 in an amount of 0.06 part by weight to 6.5 parts by weight, based on total 100 parts by weight of the electrolyte solvent.

6. The electrolyte composition for lithium secondary battery of claim 1, comprising as the anhydrosugar alcohol derivative component, the diether of anhydrosugar alcohol represented by formula 3 in an amount of 0.06 part by weight to 6.5 parts by weight, based on total 100 parts by weight of the electrolyte solvent.

7. A lithium secondary battery comprising an electrolyte composition of claim 1.

* * * * *